United States Patent [19]
Kim

[11] Patent Number: 5,162,908
[45] Date of Patent: Nov. 10, 1992

[54] CODING METHOD FOR INCREASING DATA COMPRESSION EFFICIENCY IN TRANSMITTING OR STORING PICTURE SIGNALS

[75] Inventor: Ga Y. Kim, Gwangmyeong, Rep. of Korea

[73] Assignee: Samsung Electronics Co., Ltd., Kyungki, Rep. of Korea

[21] Appl. No.: 736,509

[22] Filed: Jul. 26, 1991

[30] Foreign Application Priority Data

Aug. 31, 1990 [KR] Rep. of Korea ............... 90-13673[U]

[51] Int. Cl.⁵ ............................................ H04N 7/133
[52] U.S. Cl. ..................................................... 358/133
[58] Field of Search ......................................... 358/133

[56] References Cited

U.S. PATENT DOCUMENTS 4,974,078  11/1990  Tsai ................................. 358/133
5,045,938  9/1991   Sugiyama ........................ 358/133

Primary Examiner—Howard W. Britton
Attorney, Agent, or Firm—Robert E. Bushnell

[57] ABSTRACT

A coding method for increasing the compression efficiency during transmissions or storing of video data is disclosed. The device for carrying out the coding method includes a CPU, a ROM, a RAM and a zig-zag scanning section. In carrying out the coding method, first, run fields, a count and a coefficient number is initialized. Then ac coefficients are zig-zag scanned, and the ac coefficients are checked as to whether they are 0 or not. If the ac coefficients are not 0, the run field and the count are increased by 1, and the non-zero coefficients are grouped together. The non-zero coefficients are coded, and an EONZ code is outputted to indicate the completion of the coding of the non-zero coefficients. Then the run field for the ac coefficients is coded. According to the present invention, the size of the coding table becomes smaller, the average length of the code word can be shortened, and the encoding and decoding can be carried out in a simpler manner.

24 Claims, 5 Drawing Sheets

CODING METHOD FOR INCREASING DATA COMPRESSION EFFICIENCY IN TRANSMITTING OR STORING PICTURE SIGNALS

FIELD OF THE INVENTION

The present invention relates to a coding method for increasing data compression efficiency in transmitting or storing picture signals. Particularly, the present invention relates to a coding method having a system for transmitting and storing the data after compressing it by subjecting a DCT coefficient (discrete cosine transform coefficient) to a run-length coding (to be called hereinafter "RLC") in accordance with the frequency characteristics of the DCT coefficient, after converting analogue picture signals to digital data and translating them to a frequency domain by utilizing the DCT, in which the data having excessive run lengths is expressed in bits of variable length run field by being summed, and non-zero ac coefficients are only coded in order to expressing a self-information, thereby compressing the picture data when coding them.

BACKGROUND OF THE INVENTION

If analogue picture signals are processed after converting them to digital data in a system for processing picture data, can be corrected which errors occurred during transmissions, recordings and regenerations by utilizing an interleave, an error correction code and an interpolation. Moreover, in the case of using a recording medium such as a tape or a disc, there is no degradation of the picture quality even if copying is carried out many times.

On the other hand, there is also such a disadvantage that the amount of the data is increased due to the analogue digital conversion (to be called hereinafter "A/D conversion"), which results in lower transmitting speed and a large recording capacity is required in recording.

To solve the disadvantage, various picture data compressing methods have been proposed, and among which an RLC method has been widely used.

FIG. 1 is a block diagram showing the constitution of the conventional RLC method comprising a zig-zag scanning section 1, a run length count section 2, a grouping section 3 and a Huffman encoder 4.

FIG. 2 illustrates the scannings by the zig-zag scanning section 1 of FIG. 1.

The conventional RLC method is now described referring to FIGS. 1 and 2. In order to compress picture signals, first the picture signals are subjected to an A/D conversion and then the data are divided into a subblock of 8×8 pixel units, a DCT being carried out on each of the sub-blocks thereafter. Then the 64 DCT coefficients K0-K63 as shown in FIG. 2 which are the result of the conversion from a time domain to a frequency domain, represent some frequency components depending on their positions. Among the DCT coefficients K0-K63, the coefficient K0 which is zero in its vertical and horizontal frequencies is called the dc coefficient, and the rest of the coefficients K1-K63 are called ac coefficients. Since the dc coefficient is important in rotation to the average values of the relevant sub-blocks, it is coded separately from the ac coefficients.

Generally, the ac coefficients of picture signal has such a nature that the higher their frequencies are, the greater the probability that their values are zero is. Particularly, in carrying out a zig-zag scanning as shown in FIG. 2, there is a high probability that 0 appears successively. From considering the fact, a coding is carried out by applying the RLC method as shown in FIG. 1, thereby compressing the picture data.

Meanwhile, among the DCT coefficients of one sub-block, the dc coefficient is coded separately by applying the 1-dimensional Huffman coding method, while the other 63 ac coefficients are subjected to zig-zag scannings as shown by the dotted lines in FIG. 2, in such a manner that 0 should appear successively numerously so as for the run length to increase, the scanning being carried out by the zig-zag scanning section 1 of FIG. 1.

The ac coefficients which have undergone the zig-zag scannings are separated into 0 coefficients and non-zero coefficients, and the coefficients in which 0 appears successively are grouped together, while codings are carried out for the grouped coefficients and the non-zero coefficients appearing next to the grouped 0 coefficients. That is, the run length count section 2 counts the number of the 0 coefficients until a non-zero coefficient appears after the inputting of the ac coefficients which have undergone the zig-zag scannings. Then, the grouping section 3 classifies the group involving the non-zero group into a separate group, based upon which the category and the lower bit are obtained.

If an instance is taken for the classification of the groups, classifications are made in the form of $\pm 1$, $\pm 2 \sim \pm 3$, $\pm 4 \sim \pm 7 \ldots$, and the categories for them are $1,2,3,\ldots$.

Then the Huffman coder 4 produces and outputs ac codes based on the Huffman code table after receipt of the run lengths counted by the run length count section 2 and the categories grouped by the grouping section 3. Therefore, the lower bit for the non-zero coefficients of the grouping section 3 and the ac codes of the Huffman coder 4 can be transmitted or recorded.

The coding process described above is specified in the provision of the recommendation JPEG (on the data compressing) of the CCITT and ISO.

The RLC method is capable of coding 0 appearing between non-zero coefficients among the 63 ac coefficients but it has the problem that a large number of codes are required for the 0-15 run length and for the respective categories.

That is, since the coding becomes different for the respective non-zero coefficients depending on how many 0's exist before them, the table for defining the codes corresponding with the respective pairs of 0 coefficients and non-zero coefficients becomes large, and the average code lengths for the respective non-zero coefficients are increased. Accordingly, the coding procedure and the coding logic also become complicated. Furthermore, in the case that the successively appearing 0 are scattered with small numbers, for example, NOONOON . . . (N representing a non-zero coefficient), if a coding is carried out, the successively appearing 0, that is, the information for the run lengths are added to each of the coefficients in addition to the self information of the non-zero coefficients, which causes an increase of the total amount of the data.

SUMMARY OF THE INVENTION

It is the object of the present invention to provide a coding method for compressing the picture data for transmitting or storing in which the run lengths for the DCT ac coefficients of the picture data are expressed by adopting a separate variable length run field, and the non-zero ac coefficients are coded in such a manner as to show only the self information, thereby increasing the coding efficiency, reducing the average lengths of the codes, and ultimately compressing the amount of the data.

According to the present invention, there is provided a coding method for increasing the compression efficiency of data in transmitting or storing picture signals including a CPU for controlling an overall system, a ROM for storing a coding table and an execution program for the CPU; a RAM for storing DCT ac coefficients of the video data and outputting the stored ac coefficients to the CPU by a predetermined control; and a zig-zag scanning section for controlling the RAM so that the ac coefficients, stored in the RAM to be zig-zag scanned under the control of the CPU and to be outputted to the CPU, the method comprising: a first step for initializing a run field, a count and a coefficient number; a second step for zig-zag scanning and reading ac coefficients stored in said RAM by controlling said zig-zag scanning section, and judging as to whether said read ac coefficient is 0 or not after shifting run fields by 1 bit toward the upper bits; a third step for increasing said run field and said count one by one if it is found at the second step that the ac coefficient is not 0; a fourth step for grouping and coding only the non-zero coefficients on the basis of a coding table stored in said ROM; a fifth step for returning to the second step if the ac coefficients for one sub-block are completely processed by checking after coding the ac coefficients when the ac coefficient is 0 at the second step and when ac coefficients are non-zero at the fourth step, a sixth step for outputting an EONZ code showing the completion of the coding of the non-zero coefficients if it is found at the fifth step that the non-zero coefficients for one sub-block are completely processed; and a seventh step of coding the run field for said ac coefficients.

BRIEF DESCRIPTION OF THE DRAWINGS

The above object and other advantages of the present invention will become more apparent by describing in detail the preferred embodiment of the present invention with reference to the attached drawings in which.

DESCRIPTION OF THE PREFERRED EMBODIMENT

Figure 1:
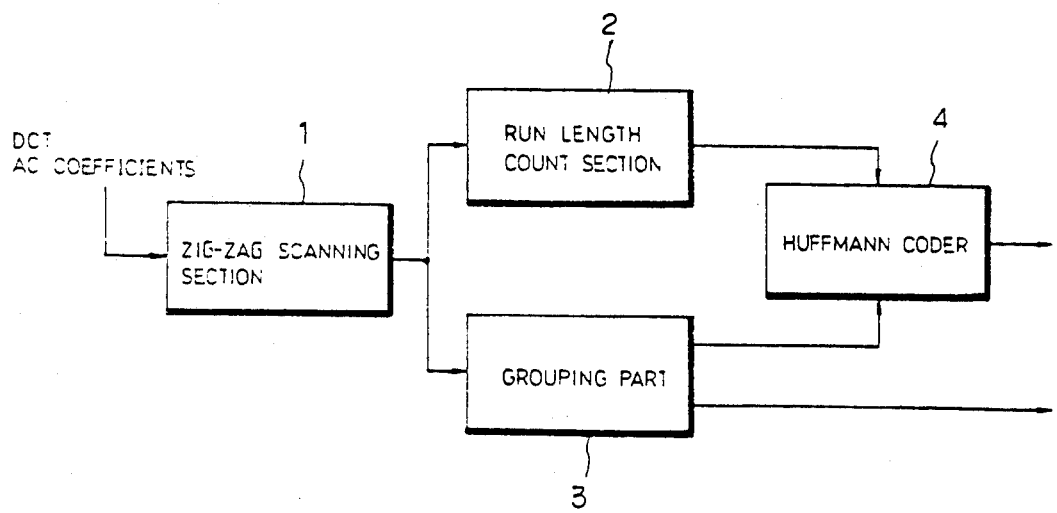
FIG. 1 is a block diagram showing the constitution of the conventional device.
Figure 3:
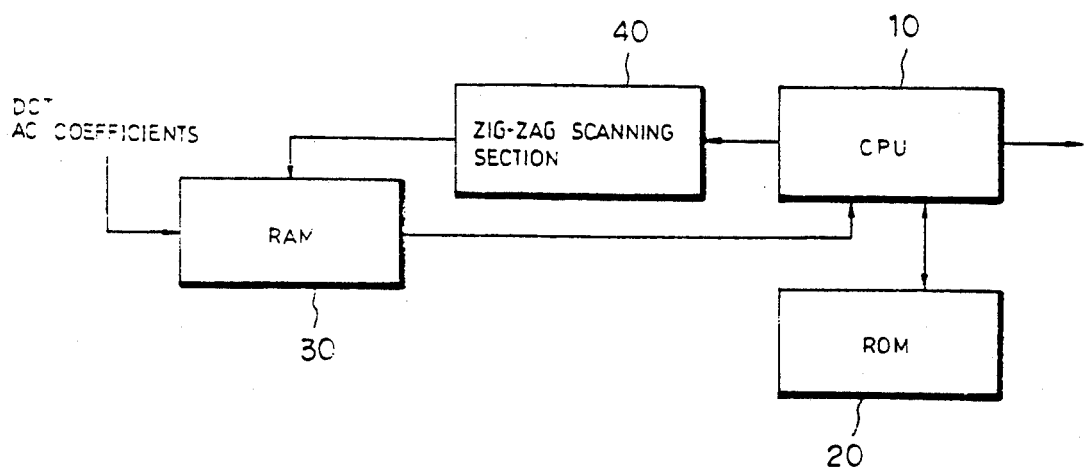
FIG. 3 is a block diagram showing the constitution of the device according to the present invention.
Figure 2:
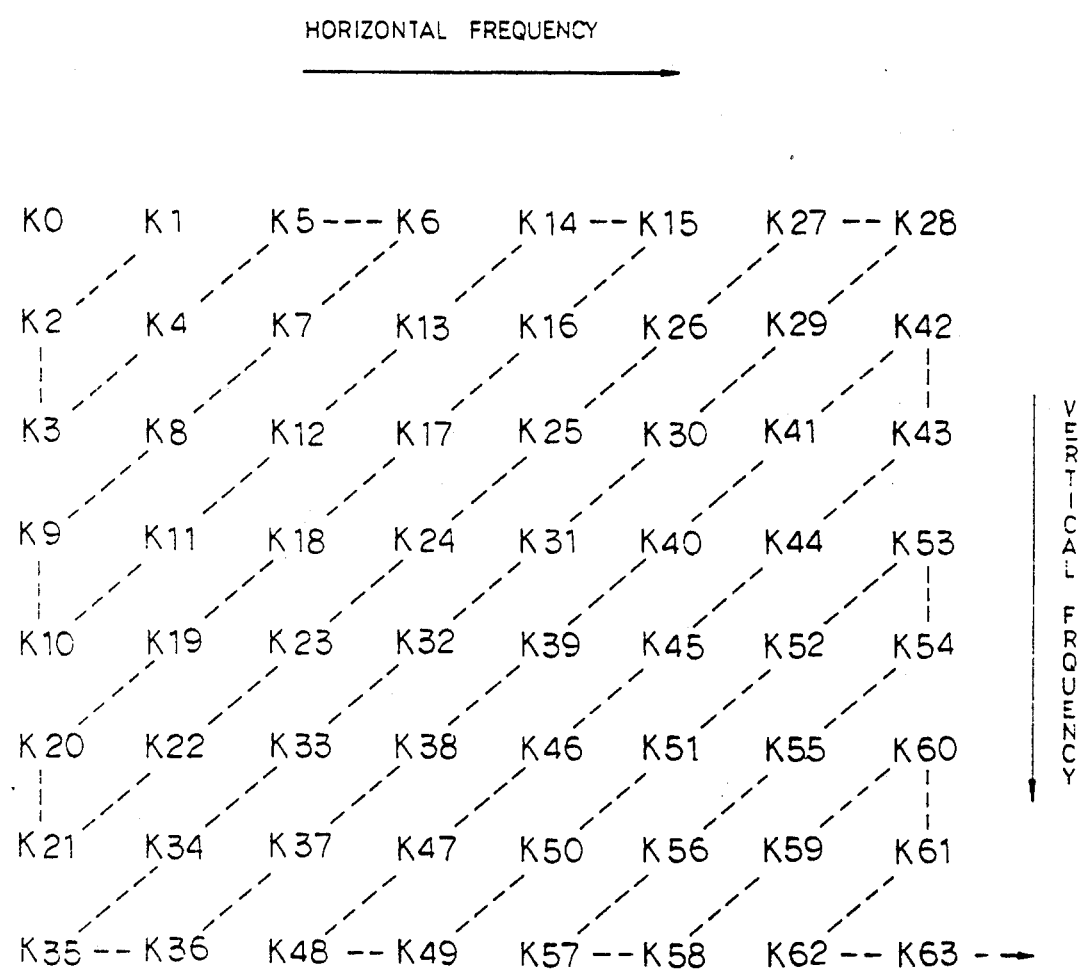
FIG. 2 illustrates a zig-zag scanning method.

FIG. 3 is a block diagram showing the constitution of the present invention, in which the device includes a CPU 10 for controlling the overall system, a ROM 20 for storing the execution programs for the CPU 10 and the tables for coding, a RAM 30 for storing the DCT ac coefficients of picture data after receipt of them and for outputting the stored ac coefficients to the CPU 10 based on the control of the CPU 10, and a zig-zag scanning section 40 for controlling the RAM 30 so that ac coefficients of the RAM 30, to be zig-zag sccanned under the control of the CPU 10 is outputted to the CPU 10.

Figure 4:
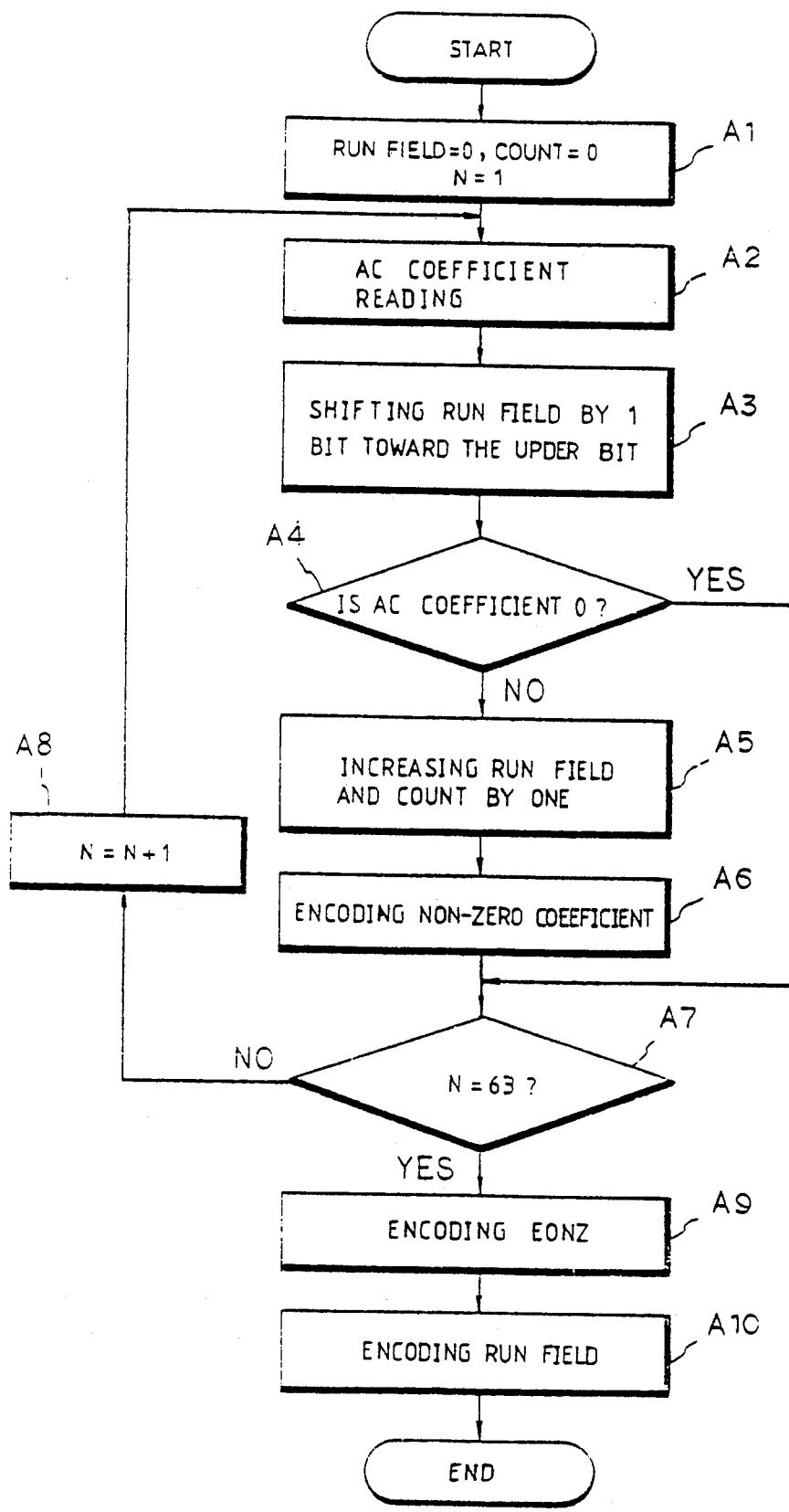
FIG. 4 is a flow chart according to the present invention.

FIG. 4 is a flow chart showing the method of the present invention, in which the method includes a first step of initializing the run fields, the count and the coefficient, a second step of reading the ac coefficients by zig-zag scanning then and judging as to whether the read ac coefficients are 0 or not after shifting the run fields by one bit toward the upper bits, a third step of increasing by one the run field and the count if the ac coefficients of the second step 2 are non-zero coefficients, a fourth step of grouping and coding only the non-zero coefficients, a fifth step of checking as to whether the ac coefficient of one sub-block are successfully processed after coding the non-zero ac coefficients in the fourth step and when the ac coefficients are 0 in the second step and then coding the next non-zero coefficients by repeatedly carrying out the second, third and fourth steps if the ac coefficients of one sub-block are not completely processed, a sixth step of outputting an EONZ code (end of non-zero code) for showing the completion of the coding of the non-zero coefficients if coding of the non-zero coefficients for one sub-block is completed in the fifth step, and a seventh step of coding the run fields for the ac coefficients.

The flow chart of FIG. 4 shows the operating sequence of the CPU of FIG. 3. Meanwhile, the run field of FIG. 4 is for expressing the run length when coding ac coefficients, and it can have a variable length between 0 and 63 bits, with each bit showing the 0 or non-zero state for the ac coefficient for the relevant frequency.

Figure 5:
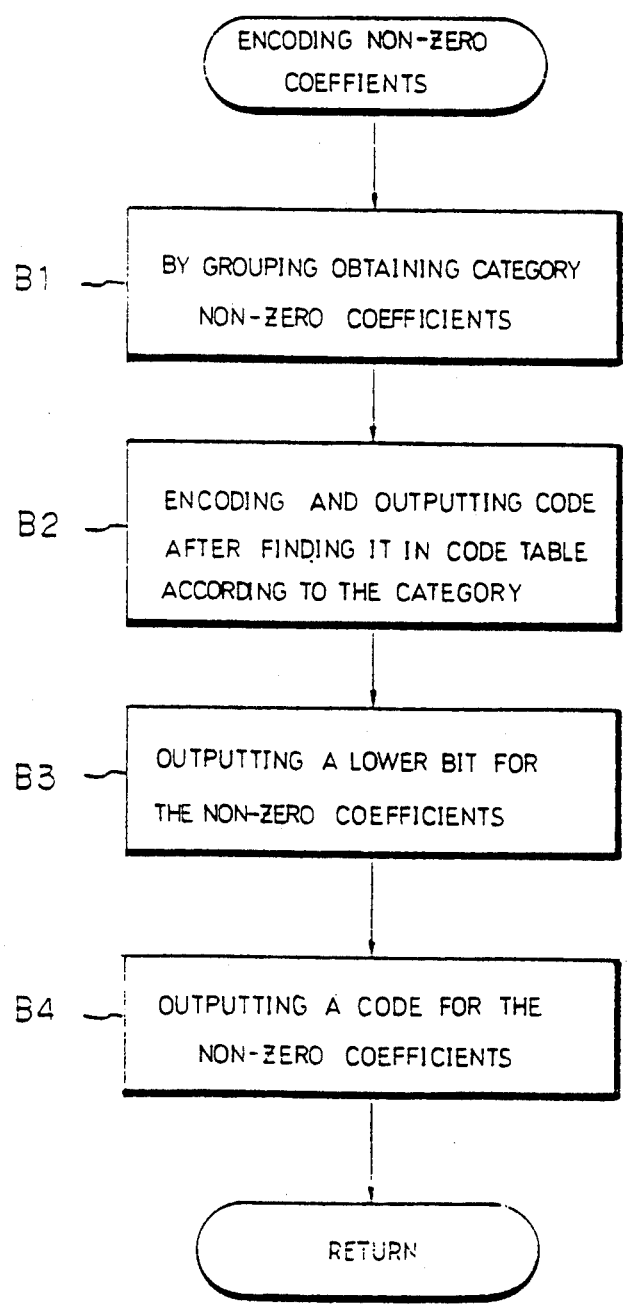
FIG. 5 is a flow chart for the non-zero coefficients as a part of FIG. 4.
Figure 6:
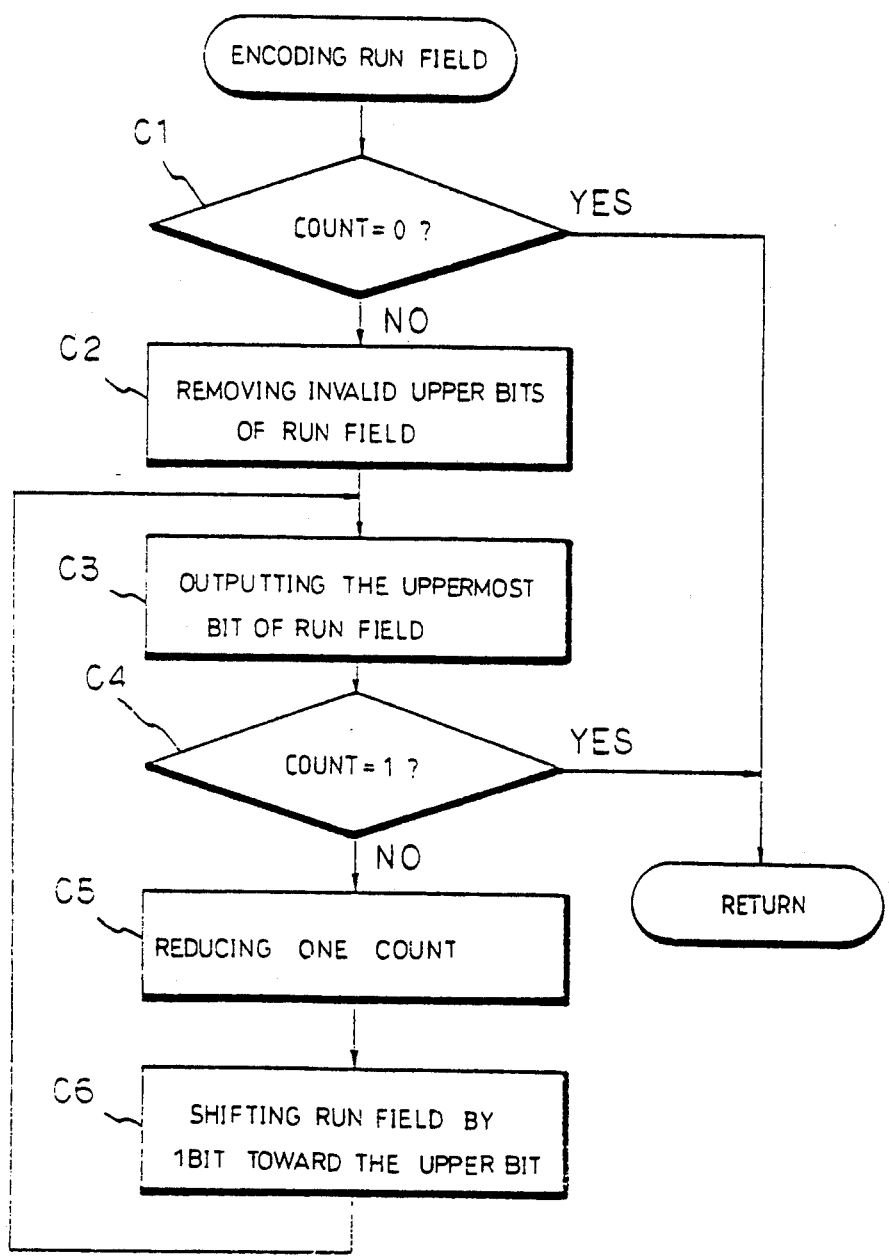
FIG. 6 is a flow chart for the run field coding as a part of FIG. 4.

FIG. 5 is a flow chart for coding the non-zero coefficient at the fourth step. FIG. 6 is a flow chart for coding the run fields at the seventh step.

The present invention will be described in further detail referring to FIGS. 3 to 6.

After the power source is turned on and the picture signals are A/D converted, upon which, when DCTs are carried out for each of the sub-blocks of 8×8 pixels and 63 coefficients excluding the dc coefficient are stored into the RAM 30 of FIG. 3, the CPU 10 is initialized at a block A1 of FIG. 4, with the run fields and the count being set 0 and with the coefficient number being set to 1, and then, at a block A2, the AC coefficients stored in the RAM 30 are read.

At this time, the CPU 10 reads the ac coefficients stored in the RAM 30 by zig-zag scanning them and by controlling the zig-zag scanning section 40.

The run field is initialized at the block A1 for indicating as to whether the respective bit has 0 for the ac coefficient for the relevant frequency. The count is for showing the number of the non-zero coefficients among the 63 ac coefficients. The number N of the coefficients is for showing how many ac coefficients among the 63 ac coefficients are coded.

At a block A3, the run fields for the unsigned 63 bits are shifted by one bit toward the upper bit and then 0 is inserted into the lowermost bit, thereby making it ready for memorizing as to whether the read ac coeffients are 0 or not before advancing to a block A4.

At the block A4, a judgement is made as to whether the read ac coefficient is 0 or not, and if it is not 0, the relevant bit of the run field is set to "1" at a block A5. Then the count is increased by one, and then, it is advanced to a block A6 where a coding routine for coding the non-zero coefficients as shown in FIG. 5 is performed. That is, at a block B1 of FIG. 5, the non-zero coefficients are grouped based on the coding table stored in the ROM 20, thereby obtaining a category.

A checking is made to which group of 1, 2-3, 4-7 . . . the absolute value of the non-zero coefficient belongs, thereby obtaining the categories 1, 2, 3, . . . .

Then, at a block B2, the non-zero coefficients are coded after finding the codes from the table as shown below and stored in the ROM 20 in advance and outputs them before advancing to a block B3.

TABLE 1

| Category | ac coefficient | ac code |
|---|---|---|
| 2 | ±(2-3) | 100 |
| 3 | ±(4-7) | 101 |
| 4 | ±(8-15) | 110 |
| 5 | ±(16-31) | 1110 |
| 6 | ±(32-63) | 11110 |
| 7 | ±(64-127) | 111110 |
| 8 | ±(128-255) | 1111110 |
| 9 | ±(256-511) | 11111110 |
| 10 | ±(512-1023) | 111111110 |
| EONZ | | 00 |

Table 1 is one example of coding tables, and if the value of a non-zero coefficient is $-9$ (its absolute value being 9), its category is 4 and its code is 110.

At the block B3, the lower bit is obtained for the non-zero coefficient, and if the absolute value of the non-zero coefficient is 9, the lower bit is obtained in the manner described below. That is, the lower bit of the non-zero coefficient showing which of 8-15 (category 4) it belongs to is found, and it is outputted from the lowermost bit. In this case, the number of the lower bits will be the category number less 1.

Then, at a block B4, a sign for the non-zero coefficient is outputted in such a manner that, if it is positive, "1" is outputted, and if it is negative, "0" is outputted.

As described above, the non-zero coefficient itself is coded regardless of the run length in contrast to the conventional method, resulting in that the coding table becomes smaller, and the encoding and decoding processes become simpler. Further, only one code is assigned to each category, therefore, the average length of the code word becomes shorter, while coding become possible for larger numbers of categories.

Upon completion of the coding for non-zero coefficient in the manner described above, the function is returned to carry out the block A7 of FIG. 4. If it is found that the ac coefficient is 0 as the result of the judgement at the block A4, then the block A7 is carried out.

At the block A7, a checking is made as to whether the number N of the coefficient is 63, which is for judging as to how many ac coefficients have been processed by now. That is, a judgement is made as to how many ac coefficients have been processed for one sub-block.

If it is found as the result of the checking that the number N of the coefficients is not 63, the function is advanced to a block A8 where the current coefficient number N is increased by 1. Then a looping is carried out to the block A2 from which the above described process is repeated. If the coefficient number N is 63, it is decided that the processing of the ac coefficients for one sub-block has been completed, and the function is advanced to a block A9. At the block A9, an EONZ code is outputted indicating the completion of the coding of the non-zero coefficients as shown in Table 1 and then the function is advanced to a block A10 where a run field coding routine is performed as shown in FIG. 6.

That is, at a block C1 of FIG. 6, a checking is made as to whether the count is 0. That is, in checking as to whether the non-zero coefficient was 0 at the previous step, if it is 0, a returning is carried out because it means that all ac coefficients are zero, while, if it is not 0, the invalid upper bits are removed by shifting out them in order to leave only the valid lower bits among the 63 bits of the whole run field at a block C2.

At a block C3, the uppermost bit of the run fields is outputted and then the function advances to a block C4 where a checking is made as to whether the count is 1. That is, the whole of the run field has been outputted, and if the count is not 1, it is judged that the run field has not been wholly outputted. Therefore, at a block C5, the current count value is decreased by 1, and then a block C6 is carried out.

At the block C6, the run fields are shifted by one bit toward the upper bits, so that the information bit for the next ac coefficient occupies the uppermost bit. Then a looping is carried out to the block C3 where the above described process is repeated until the run fields are all outputted.

Then the run field coding process is carried out in the manner described above, and upon outputting all the run fields, a return is carried out to terminate the operation.

As described above, for the ac coefficients for a sub-block, the outputting is made after bundling the scattered run length into run field of 63 bits. Of the 63 ac coefficients, if the ac coefficient is 0, then 0 is outputted, while, if the ac coefficient is not 0, then "1" is outputted, but in such a manner that the outputting is made not for all the 63 bits but only for "1" bits to the last "1" bit.

That is, the unnecessary "0" bits are not outputted, so that the amount of the picture data can be compressed. Therefore, the run length information is not increased to a great volume like in the case of the conventional method.

Accordingly, the run field together with the ac code, the lower bit and the sign for the non-zero coefficient are transmitted through a proper transmitting path or recorded on a proper recording medium. Thus the volume of the data is greatly reduced, so that the transmitting speed can be improved as well as recording a larger amount of data on the same recording medium.

The present invention can be applied to a digital VTR, CDI(compact disc interactive), digital camera, electronic game machines and the like which are the media capable of recording and regenerating data after compressing and coding them. The present invention can also be applied to color facsimile, video telephone, video conference system, electronic post box, color television and the like which are capable of transmitting the video data after compressing them. The present invention can also be applied to ID TV, ED TV, HD TV and multi-function VTR in which a large capacity of memory is required for digital processing of video signals.

As described above, the present invention uses a coding method which is capable of compressing the data based on the RLC method during a transmission or storing of picture data. According to the method of the present invention, the run length for the DCT ac coefficients for the picture data is expressed using separate variable length run fields.

Meanwhile, the non-zero ac coefficient is for coding in such a manner that only the self information can be expressed. Thus the ac coefficients are coded regardless of the run length, resulting in that the size of the coding table can be reduced, that the average length of the code word can be shortened, and that the encoding and decoding are rendered simpler. Further, the run length is coded by incorporating it into the variable length run fields, with the result that the run length information can be greatly reduced.

The invention is in no way limited to the embodiment described hereinabove. Various modifications of the disclosed embodiment as well as other embodiments of the invention will become apparent to persons skilled in the art upon reference to the description of the invention. It is therefore contemplated that the appended claims will cover any such modifications or embodiments as fall within the true scope of the invention.

What is claimed is:

1. A coding method for increasing the compression efficiency of picture signal data in a coding apparatus, said coding apparatus comprising: controlling means for controlling said coding apparatus, first memory means for storing a coding table; second memory means for storing discrete cosine transform coefficients of said picture signal data and providing said discrete cosine transform coefficients to said controlling means; and zig-zag scanning means for addressing said discrete cosine transform coefficients stored in said second memory means in a zig-zag pattern, said coding method comprising:

initializing run fields and a count;
after initializing said run fields and said count, successively performing; zig-zag scanning and reading of said discrete cosine transform coefficients stored in said second memory means in response to said zig-zag scanning means, shifting said run fields by one bit,
incrementing said run fields and said count by one if said discrete cosine transform coefficients are non-zero, and
coding only non-zero discrete cosine transform coefficients on the basis of said coding table stored in said first memory means;
after successively performing said coding of said non-zero discrete cosine transform coefficients so that one sub-block has been coded, generating an end code indicating completion of the coding of said one sub-block; and
after successively performing said coding of said non-zero discrete cosine transform coefficients so that one sub-block has been coded, coding said run fields.

2. The coding method as claimed in claim 1, wherein said coding said discrete cosine transform coefficients comprises generating codes from said coding table corresponding to each of the non-zero discrete cosine transform coefficients and generating sign bits for each of said non-zero discrete cosine transform coefficients.

3. The coding method as claimed in claim 1, wherein said coding said run fields comprises removing invalid upper bits of said run fields and when said count is non-zero successively generating said run fields until all said run fields are generated.

4. The coding method as claimed in claim 1, wherein each of said codes from said coding table correspond to at least one possible value of said non-zero discrete cosine transform coefficients.

5. The coding method as claimed in claim 1, wherein each of said codes from said coding table correspond to a plurality of possible values of said non-zero discrete cosine transform coefficients.

6. The coding method as claimed in claim 1, wherein said coding said run fields occurs after generating said end code.

7. The coding method as claimed in claim 1, wherein successively generating said run fields comprises successively shifting out said run fields and decrementing said count by 1.

8. The coding method as claimed in claim 1, wherein a coding scheme embodied in said coding table is:

| values of discrete cosine transform coefficients | discrete cosine transform coefficients codes |
| --- | --- |
| ±(2–3) | 100 |
| ±(4–7) | 101 |
| ±(8–15) | 110 |
| ±(16–31) | 1110 |
| ±(32–63) | 11110 |
| ±(64–127) | 111110 |
| ±(128–255) | 1111110 |
| ±(256–511) | 11111110 |
| ±(512–1023) | 111111110. |

9. A coding method for increasing the compression efficiency of picture signal data, said coding method comprising:

initializing run fields and a count;
after initializing said run fields and said count, successively performing: zig-zag scanning and reading of discrete cosine transform coefficients, shifting said run fields by one bit, incrementing said run fields and said count by one if said discrete cosine transform coefficients are non-zero, and coding only non-zero discrete cosine transform coefficients on the basis of a coding table stored;
after successively performing said coding of said non-zero discrete cosine transform coefficients so that one sub-block has been coded, generating an end code indicating completion of the coding of said one sub-block; and
after successively performing said coding of said non-zero discrete cosine transform coefficients so that one sub-block has been coded, coding said run fields.

10. The coding method as claimed in claim 9, wherein said coding said discrete cosine transform coefficients comprises generating codes from said coding table corresponding to each of the non-zero discrete cosine transform coefficients and generating sign bits for each of said non-zero discrete cosine transform coefficients.

11. The coding method as claimed in claim 9, wherein said coding said run fields comprises removing invalid upper bits of said run fields and when said count is non-zero successively generating said run fields until all said run fields are generated.

12. The coding method as claimed in claim 9, wherein each of said codes from said coding table correspond to at least one possible value of said non-zero discrete cosine transform coefficients.

13. The coding method as claimed in claim 9, wherein each of said codes from said coding table correspond to a plurality of possible values of said non-zero discrete cosine transform coefficients.

14. The coding method as claimed in claim 9, wherein said coding said run fields occurs after generating said end code.

15. The coding method as claimed in claim 9, wherein successively generating said run field comprises successively shifting out said run fields and decrementing said count by 1.

16. The coding method as claimed in claim 9, wherein a coding scheme embodied in said coding table is:

| values of discrete cosine transform coefficients | discrete cosine transform coefficients codes |
| --- | --- |
| ±(2–3) | 100 |
| ±(4–7) | 101 |
| ±(8–15) | 110 |
| ±(16–31) | 1110 |
| ±(32–63) | 11110 |
| ±(64–127) | 111110 |
| ±(128–255) | 1111110 |
| ±(256–511) | 11111110 |
| ±(512–1023) | 111111110. |

17. A coding apparatus performing a coding method for increasing the compression efficiency of picture signal data, said coding apparatus comprising:
  controlling means for controlling said coding apparatus;
  first memory means for storing a coding table;
  second memory means for storing discrete cosine transform coefficients of said picture signal data and providing said discrete cosine transform coefficients to said controlling means; and
  zig-zag scanning means for addressing said discrete cosine transform coefficients stored in said second memory means in a zig-zag pattern;
  wherein said coding method comprises:
    initializing run fields and a count;
    after initializing said run fields and said count, successively performing: zig-zag scanning and reading of said discrete cosine transform coefficients stored in said second memory means in response to said zig-zag scanning means, shifting said run fields by one bit, incrementing said run fields and said count by one if said discrete cosine transform coefficients are non-zero, and coding only non-zero discrete cosine transform coefficients on the basis of said coding table stored in said first memory means;
    after successively performing said coding of said non-zero discrete cosine transform coefficients so that one sub-block has been coded, generating and end code indicating completion of the coding of said one sub-block; and
    after successively performing said coding of said non-zero discrete cosine transform coefficients so that one sub-block has been coded, coding said run fields.

18. The coding apparatus as claimed in claim 17, wherein said coding said discrete cosine transform coefficients comprises generating codes from said coding table corresponding to each of the non-zero discrete cosine transform coefficients and generating sign bits for each of said non-zero discrete cosine transform coefficients.

19. The coding apparatus as claimed in claim 17, wherein said coding said run fields comprises removing invalid upper bits of said run fields and when said count is non-zero successively generating said run fields until all said run fields are generated.

20. The coding apparatus as claimed in claim 17, wherein each of said codes from said coding table correspond to at least one possible value of said non-zero discrete cosine transform coefficients.

21. The coding apparatus as claimed in claim 17, wherein each of said codes from said coding table correspond to a plurality of possible values of said non-zero discrete cosine transform coefficients.

22. The coding apparatus as claimed in claim 17, wherein said coding said run fields occurs after generating said end code.

23. The coding apparatus as claimed in claim 17, wherein successively generating said run fields comprises successively shifting out said run fields and decrementing said count by 1.

24. The coding apparatus as claimed in claim 17, wherein a coding scheme embodied in said coding table is:

| values of discrete cosine transform coefficients | discrete cosine transform coefficients codes |
| --- | --- |
| ±(2–3) | 100 |
| ±(4–7) | 101 |
| ±(8–15) | 110 |
| ±(16–31) | 1110 |
| ±(32–63) | 11110 |
| ±(64–127) | 111110 |
| ±(128–255) | 1111110 |
| ±(256–511) | 11111110 |
| ±(512–1023) | 111111110. |

* * * * *

UNITED STATES PATENT AND TRADEMARK OFFICE
CERTIFICATE OF CORRECTION

Page 1 of 4

PATENT NO. : 5,162,908
DATED : 10 November 1992
INVENTOR(S) : Ga Yeong KIM

It is certified that error appears in the above-indentified patent and that said Letters Patent is hereby corrected as shown below:

TITLE PAGE

Item: [75]　　　　change "Ga Y. Kim" to --Ga Yeong Kim--;

| | | |
|---|---|---|
| Column 1, | line 20, | after "zero", change "ac" to --alternating current (ac)--; |
| | line 43, | after "method", change "comprising" to --including-; |
| | line 59, | after "the", change "dc" to --direct current (dc)--; |
| | line 65, | before "picture", insert --the--, and after "signal", change "has" to --have--; |
| | line 67, | after "zero", delete "is"; |
| Column 2, | line 66, | after "storing", insert a comma -- , --; |

UNITED STATES PATENT AND TRADEMARK OFFICE
CERTIFICATE OF CORRECTION

PATENT NO. : 5,162,908
DATED : 10 November 1992
INVENTOR(S) : Ga Yeong KIM

It is certified that error appears in the above-indentified patent and that said Letters Patent is hereby corrected as shown below:

Column 3, line 9, before "for", change "CPU" to

--central processing unit (CPU)--;

line 10, before "for", change "ROM" to

--read only memory (ROM)---;

--random access memory (RAM)--;

lines 16-17, change "outputted" to --output--;

line 17, after "method", change "comprising" to

--including--;

lines 20, 21, 23, 24, 27, and 37, change "said" (all occurrences) to --the--;

line 53, after " 4 ", change " . " to --; and--;

Column 4, line 1, after "CPU", change "10 is outputted" to

--10, is output--;

UNITED STATES PATENT AND TRADEMARK OFFICE
CERTIFICATE OF CORRECTION

PATENT NO. : 5,162,908
DATED : 10 November 1992
INVENTOR(S) : Ga Yeong KIM

It is certified that error appears in the above-indentified patent and that said Letters Patent is hereby corrected as shown below:

Column 4, line 7, after "scanning", change "then" to them;

Column 5, lines 31, 35, 36 and 64, change "outputted" to --output--(all occurrences);

lines 43, after "while" change "coding" to --coding--;

Column 6, lines 10, 14, 22, 31, and 35, change "outputted" to --output--(all occurrences):

Column 7, line 35, after "bit", change " , " to -- ; --;

line 53, before "coding", delete "said";

line 64, after "table", change "correspond" to --corresponds--;

line 68, after "table", change "correspond" to --corresponds--;

Column 8, line 58, after "table", change "correspond" to --corresponds--;

line 63, after "table", change "correspond" to --corresponds--;

UNITED STATES PATENT AND TRADEMARK OFFICE
CERTIFICATE OF CORRECTION

PATENT NO. : 5,162,908
DATED : 10 November 1992
INVENTOR(S) : Ga Yeong KIM

It is certified that error appears in the above-indentified patent and that said Letters Patent is hereby corrected as shown below:

Column 10    lines 20-21,    after "table", change "correspond" to --corresponds--;

lines 24-25,    after "table", change "correspond" to --corresponds--:

Signed and Sealed this

Tenth Day of September, 1996

Attest:

BRUCE LEHMAN

Attesting Officer          Commissioner of Patents and Trademarks